March 8, 1938.  C. O. HILL  2,110,420
VEHICLE DIRECTION SIGNAL
Filed Dec. 3, 1934  2 Sheets-Sheet 1

INVENTOR.
Charles O. Hill
BY
ATTORNEY.

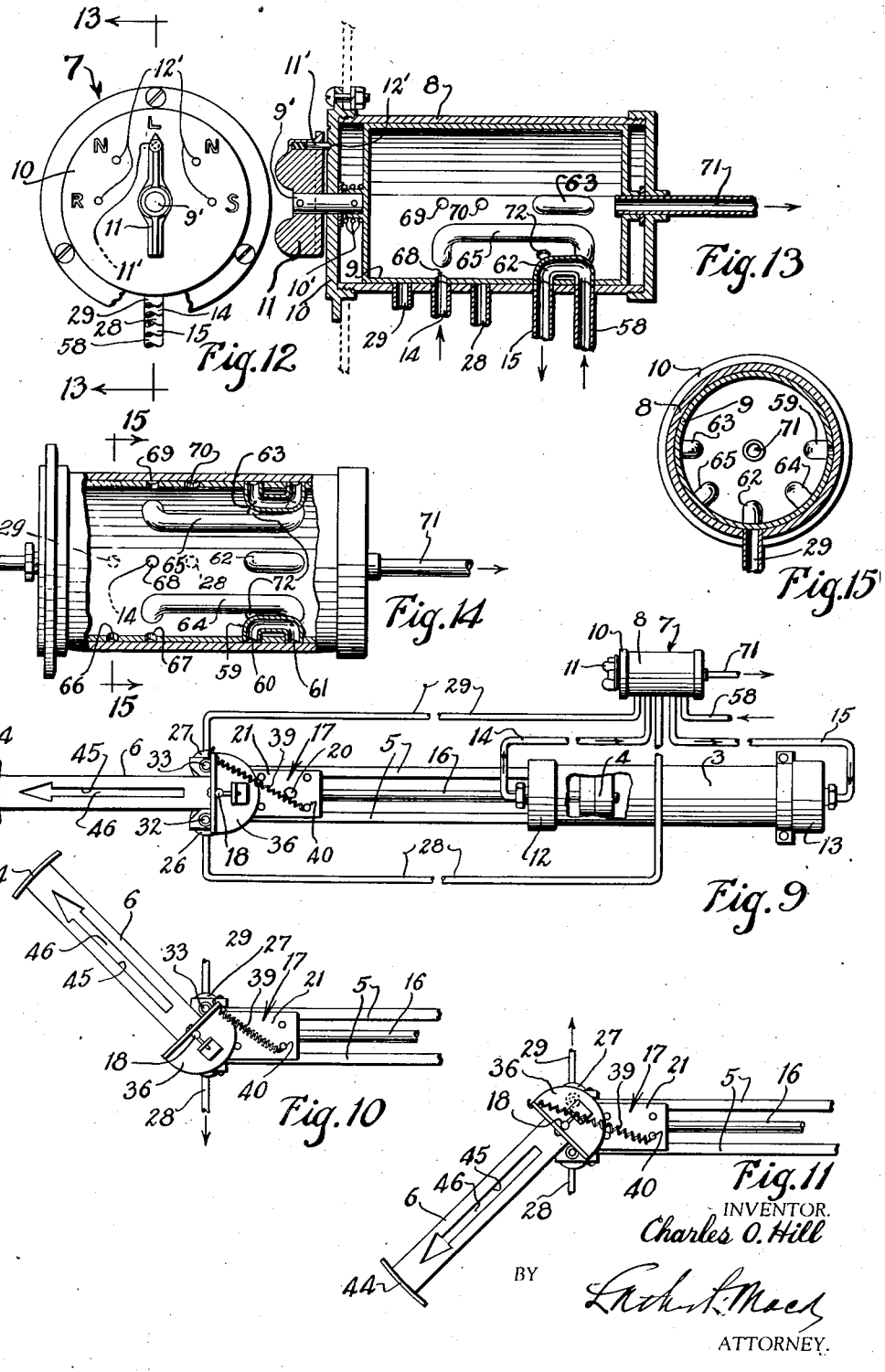

Patented Mar. 8, 1938

2,110,420

UNITED STATES PATENT OFFICE 2,110,420

VEHICLE DIRECTION SIGNAL

Charles O. Hill, Los Angeles, Calif.

Application December 8, 1934, Serial No. 756,572

13 Claims. (Cl. 116—39)

This invention relates to and has for a main object the provision of a manually controlled vacuum operated semaphore signal permanently attachable to the top of an automobile body adjacent the windshield, or in any other suitable position, normally housed within the top of the vehicle and adapted to be extended horizontally and inclined upwardly or downwardly, for indicating, respectively, a right turn, left turn, or stop of the vehicle, as may be contemplated by the operator thereof, and to be restored to hidden position in the top at the will of the operator after each signalling operation.

The invention contemplates the provision of connections between the signalling means and a suction chamber of an internal combustion motor, or other source of vacuum, by means of which, upon the operation of the control means by the operator, the signal will be extended and retracted without manual effort, and selectively inclined upwardly or downwardly from a horizontal position, in accordance with the intended turning or stoppage of the vehicle, and means for automatically illuminating the signalling member, or semaphore for rendering the signal visible at night.

Other and more detailed objects of invention will appear as the description progresses.

I have shown in the accompanying drawings a preferred embodiment of my invention, subject to modification, within the scope of the appended claims, without departing from the spirit thereof.

Figure 3:
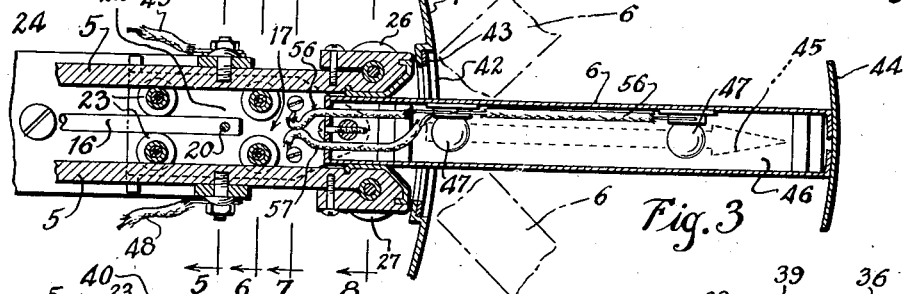
Fig. 3 is a sectional plan of the semaphore on line 3—3 of Fig. 2, and associated parts.

Figs. 5, 6, 7, and 8 are, respectively, transverse sections on lines 5—5, 6—6, 7—7 and 8—8 of Fig. 3;

Fig. 9 is a side view of the signal apparatus, partly in section and partly diagrammatic, showing the operative connections between the semaphore, the vacuum operated piston and cylinder, and the control means in which the signal is set to indicate a left hand turn of the vehicle;

Figs. 10 and 11 are, respectively, fragmentary side views of the signal shown in upwardly and downwardly inclined positions for indicating right hand turns and stops;

Fig. 12 is an end view of the control valve and operating member;

Fig. 13 is a longitudinal section of the same on line 13—13 of Fig. 12;

Fig. 14 is a view of the control valve, partly in section; and

Fig. 15 is a transverse section of the control valve on line 15—15 of Fig. 14.

Figures 1, 4:
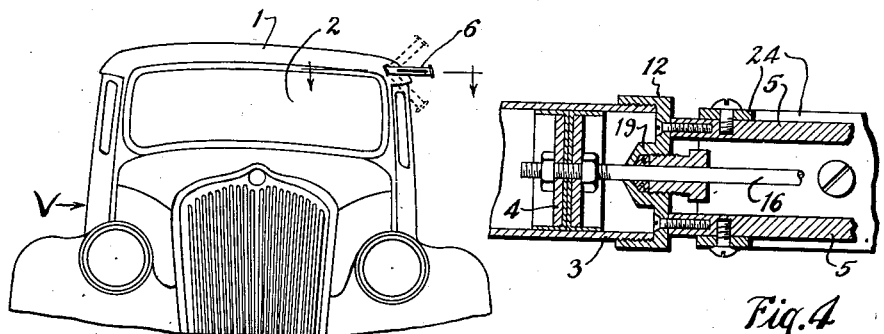
Fig. 1 is a front elevation of an automobile body showing the signal extended for indicating a left hand turn, and indicating in broken lines the position of the signal for indicating right hand turns and stops.
Fig. 4 is a sectional plan on line 4—4 of Fig. 2 of a vacuum cylinder and piston operatively connected with and for extending and retracting the semaphore.

As shown in Fig. 1 the signal apparatus is preferably mounted in the top 1 of a vehicle V in a position slightly above and to the rear of the windshield 2 so as to be normally hidden from view and enclosed within the top 1. For providing the customary signals, the semaphore 6 is adapted to be extended, as shown, to a horizontal position externally of the top 1 and thereafter to be upwardly or downwardly inclined, as indicated in broken lines, for indicating proposed right turns or stops. When extended as shown in full lines the signal indicates a proposed left hand turn.

Briefly described, the apparatus includes a vacuum cylinder 3, a piston 4 reciprocable in said cylinder, guides 5, 5, rigidly connected with cylinder 3, a semaphore 6 slidable on said guides, and a control valve 7 embodying a cylinder 8, a cylindrical valve 9, a dial 10 and an operating member 11. Cylinder 3 has heads 12 and 13 secured to opposite ends thereof and adapted to be connected by means of tubes 14 and 15, respectively, with cylinder 8 of the control means, whereby, upon the proper operation of valve 9, suction may be applied to opposite sides of piston 4, for extending and retracting the piston and the semaphore 6. A rod 16 connects piston 4 with a slide 17 on which the semaphore 6 is pivotally mounted at 18.

Figures 5, 6, 7, 8:
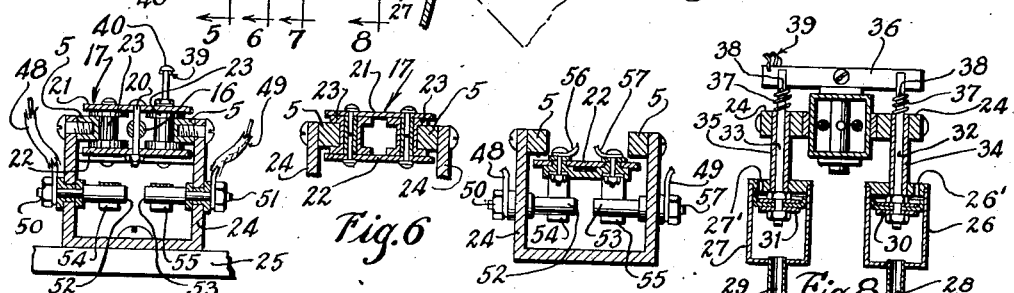

Head 12 may have a suitable stuffing box 19 for packing the rod 16 and the extended end of said rod is attached as by means of a pin or screw 20 to slide 17, said slide being formed with upper and lower plates 21 and 22 between and on which a plurality of rollers 23, 23, etc. are rotatably held for engagement with the parallel guides 5, 5. A channeled frame member 24 may be provided for attachment to a suitable member 25 of the top 1 and the guides 5, 5, may be attached to or formed on the edges of the legs of member 24, as shown in Fig. 5, so that the slide 17 will be free to move longitudinally of the guides as the piston is correspondingly reciprocated.

On the outer ends of members 5 a pair of vacuum cylinders 26 and 27 (see Fig. 8) are rigidly mounted in transversely opposite positions and are connected at their outer ends with the control valve cylinder 8, respectively, by means of tubes 28 and 29. Pistons 30 and 31 are reciprocably mounted in the cylinders 26 and 27, respectively, and have stems 32 and 33 which are slidably held in rigid hollow members 34 and 35, respectively, attached to and depending from members 5, and the ends of said stems 32 and 33 extend substantially beyond members 5 into the path of the outer transverse edge of a semi-circular plate 36 which is rigidly attached to the inner portion of semaphore 6. A spring 37 is carried on each of stems 32 and 33 and is compressed between the upper surface of member 24 and a pin 38 held in each of said stems, and tends to urge the piston in each of the cylinders 26 and 27 upwardly to its extreme of movement. The pistons 30 and 31 are moved downwardly so as to remove the upper ends of stems 32 and 33 from the path of plate 36, selectively, by means of suction created in the bottoms of the cylinders 26 and 27 when the control valve 9 is properly operated, as hereinafter described.

As shown in Figs. 9, 10, and 11, both stems 32 and 33 engage plate 36 when the signal arm is horizontally extended, and said stems alternately engage said plate when the signal arm is inclined in opposite directions. Said stems operate as fulcrums for inclining the signal arm, as shown in Figs. 10 and 11.

It will be noted that a tension spring 39 is provided for tensioning the semaphore 6 so as to restore the semaphore to normal horizontal position at the completion of a "Stop" signalling operation i. e. when the semaphore is inclined as in Fig. 11 on stem 32 as a fulcrum, said spring is attached at its opposite ends to the upper side of plate 36 and a point 40 on the upper plate 21 of slide 17. (See Fig. 11.) Gravity is relied upon to restore the semaphore 6 to horizontal position from an upwardly inclined position, as shown in Fig. 10.

As shown in Fig. 3, the outer surface of the vehicle top 1 is recessed at 42 and provided with a waterproof gasket 43 in the bottom of the recess so that a plate 44 attached to the outer end of semaphore 6 may seat in the recess with its outer surface flush with the outer surface of the top.

Semaphore 6 is of rectangular hollow cross section and is normally axially alined with cylinder 3, with plate 36 mounted on the side of the semaphore so that its forward edge will engage one or the other of the piston stems 32 or 33 and thus determine the inclination of the semaphore, if any, at each operation of the signal. Opposite sides—front and back—of the semaphore have apertures preferably in the form of arrows, as 45, substantially elongated, preferably covered by glass or celluloid sheets 46 so that light may emanate from one or more lamps 47 suitably mounted in the semaphore, for illuminating the signal at night, or on dark days.

Figure 2:
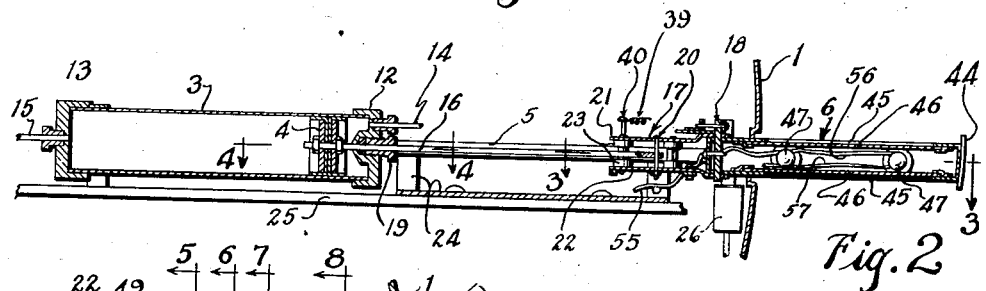
Fig. 2 is a longitudinal section, in elevation, of the signal apparatus operatively mounted in the top of a vehicle, on line 2—2 of Fig. 1.

Electric wires 48 and 49 are adapted to be connected with a source of electric current and terminate on binding posts 50 and 51 which are oppositely mounted near the outer end of and on member 24; and inwardly extended contacts 52 and 53 project from said posts for engagement with laterally spaced spring contacts 54 and 55 which are secured to the lower side of semaphore 6 and are connected with lamps 47, 47 by means of wires 56 and 57, or by a single wire as when the lamps are arranged in series. Thus, as the semaphore approaches its outward extreme of movement on the guides 5, 5, the electrical contacts are engaged for energizing the lamps 47, and said lamps remain energized as long as the semaphore is extended and until the same has been restored to a position inwardly of the position shown in Fig. 2.

The control valve 7 preferably, as a matter of convenience in operation, but not necessarily, has five positions as indicated on the face of the dial 10, namely "Right", "Neutral", "Left", "Neutral" and "Stop", so that by turning the operating knob 11 from one neutral position either to the right or to the left as shown in Fig. 12, the valve 9 may be set for a right turn or a left turn, and in either direction from the other neutral position the valve may be set for a left turn or a stop position.

In addition to the tubes 29, 14, 28, and 15 shown in Fig. 13 which connect with the valve cylinder 8 a tube 58 leads outwardly from said cylinder and forms a free air inlet with which other tubes 29, 14, 28, and 15 are longitudinally alined. At different peripheral positions internally of valve 9 bypasses are provided for connecting certain of the tubes 29, 14, 28, 15, and 58 as follows: a bypass 59 connects peripheral ports 60 and 61 in said valve for affording communication between tubes 15 and 58; similar bypasses 62 and 63 are provided at spaced points with corresponding peripheral ports in the valve for a like purpose; and a pair of longer bypasses 64 and 65 are provided between bypasses 59 and 62 and 63 for affording communication between tubes 14 and 58. The ends of said bypasses all open at the periphery of the valve 9 for registration with certain of the tubes 29, 14, 28, 15 and 58.

Alined with bypass 59 a pair of peripheral ports 66 and 67 are provided in valve 9 for registration with tubes 29 and 14; alined with bypass 62 a single port 68 in valve 9 is provided for registration with tube 14; and alined with bypass 63 a pair of ports 69 and 70 are provided for registration with tubes 14 and 28. The interior of valve 9 is connected with a source of vacuum by means of a centrally disposed tube 71. Thus, a partial vacuum constantly exists in valve 9 which is communicated to the cylinder 3 on one or the other side of piston 4 as the case may be, and to the cylinders 26 and 27, depending upon the operation of member 11 for displaying a signal to correspond to a proposed movement or stoppage of the vehicle. Also, in line with each of the two neutral connections 64 and 65 I provide a port 72 in valve 9 for registration with tube 15.

The connections just described permit of the following operations: when the valve 9 is positioned for a left hand turn, as shown in Figs. 12 and 13, port 68 registers with pipe 14, thereby applying vacuum to the forward and outer side of piston 4 through tube 14, and by-pass 62 connects pipes 15 and 58, whereby free air from the atmosphere is conducted to the inner end of cylinder 3 at the rear of piston 4 so that the vacuum so applied may move the piston forwardly in the cylinder for extending the semaphore 6 to the position shown in Fig. 9. On the completion of a left turn, the movement of operating member 11 in either direction from the position shown will move one of the bypasses 64 and 65 to register with tubes 14 and 58 for admitting air from the atmosphere to the outer end of cylinder 3 while the associated port 72 will register with pipe 15, thereby applying vacuum to the rear end of cylinder 3 and effect the restoration of piston 4 and semaphore 6 to their normally inward positions.

A right hand turn signal is effected by moving member 11 to the left as seen in Fig. 12, so as to register ports 69 and 70 with tubes 14 and 28, respectively, and bypass 63 with tubes 15 and 58, thereby applying vacuum, as before, to the forward side of piston 4 for moving the semaphore 6 into the position shown in Fig. 9. However, vacuum is applied to piston 30 in cylinder 26 through pipe 28 and effects the depression of stem 32 from the path of plate 36, thereby effecting the upward swing of the semaphore 6 to the inclined position shown in Fig. 10 by reason of the engagement of stem 33 with the associated portion of plate 36. Air from the atmosphere is admitted through tube 58, bypass 63 and tube 15 to the rear end of cylinder 3. The return to neutral position is accomplished in the same manner as when making a left hand turn.

For a stop signal the member 11 is turned to the right as seen in Fig. 12 until ports 66 and 67 register with tubes 29 and 14, respectively, and bypass 59 registers with tubes 15 and 58, whereupon the piston 4 and semaphore 6 are moved outwardly as before, the piston 31 in cylinder 27 is depressed so that its stem 33 will be removed from the path of the plate 36, and the semaphore will then swing downwardly into the inclined position shown in Fig. 11 by reason of the engagement of stem 32 with plate 36. The restoration from this position is effected as before.

It will be noted that the vacuum from valve 9 is constantly applied to the rear side of the piston 4 when the valve is in neutral position and serves to hold the piston at its rearmost extreme of movement and the semaphore completely housed in the top 1 of the vehicle.

Operating member 11 is secured to a stem 9' of valve 9 and a spring 10' is carried on said stem between end 10 and the adjacent end of said valve for tensioning member 11. Also, a spring detent 11' may be held in member 11 for seating in notches 12' at the different positions on dial 10, as shown in Figs. 12 and 13.

The cylinders 26 and 27 are provided with free air vents 26' and 27', respectively, by means of which air is drawn into the cylinders above the pistons as suction is applied to the opposite sides of the pistons and discharged from the cylinders as said pistons move upwardly therein.

The apparatus shown and described herein is simple and effective and is operable without manual effort except for the operation of the control valve 9 which may be mounted in a suitable position on the instrument board or steering post of the vehicle.

What I claim is:

1. A direction signal for vehicles comprising a cylinder, a piston reciprocable therein, a semaphore operatively connected with said piston for extension to and retraction from signalling position, a control valve connected with said cylinder and with a source of vacuum, and means adapted to be rendered operative by said valve for applying suction to said piston for first horizontally extending said semaphore to one signalling position, and means effective thereafter for selectively inclining said semaphore upwardly or downwardly, at will, from said first position to second or third signalling positions for indicating different movements of a vehicle.

2. A direction signal for vehicles comprising a cylinder, a piston reciprocable therein, a semaphore operatively connected with said piston for extension to and retraction from signalling position, a control valve connected with said cylinder and with a source of vacuum, and means adapted to be rendered operative by said valve for applying suction to said piston for initially extending said semaphore horizontally to one signalling position, and means for thereafter selectively inclining said semaphore upwardly or downwardly at will, from said initial position to second and third signalling positions for indicating different movements of a vehicle, and means for restoring said semaphore to inoperative position at the completion of signalling operations.

3. A direction signal for vehicles comprising a cylinder, a vacuum operated piston therein, a semaphore operatively connected with said piston for horizontal extension to and from signalling position, and means for extending the semaphore in upwardly or downwardly inclined positions to indicate different movements of the vehicle including a control valve connected with said means and with a source of vacuum for selectively operating said semaphore so as to display different signals corresponding to the proposed movement of the vehicle.

4. A direction signal for vehicles comprising a cylinder, a vacuum operated piston therein, a semaphore operatively connected therewith, a control valve connected with a source of vacuum and with said cylinder for regulating the horizontal extension of said semaphore to a horizontal signalling position, and means operable when said semaphore has been horizontally extended a predetermined extent for tilting the same upwardly or downwardly, as described.

5. A direction signal for vehicles comprising a frame, a cylinder thereon, a vacuum operated piston therein, a semaphore operatively connected therewith for horizontal movement on said frame, a control valve connected with a source of vacuum and with said cylinder for regulating the extension of said semaphore to a horizontal signalling position, and means operable when said semaphore reaches a predetermined horizontally extended position for tilting the same upwardly or downwardly, said means including a pair of selectively extensible members engageable with portions of said semaphore, and means for restoring said semaphore to normally retracted position at the completion of each signalling operation.

6. A direction signal for vehicles comprising a cylinder, a vacuum operated piston therein, a control valve connected with a source of vacuum and arranged for affording communication between said source of vacuum and opposite portions of said cylinder, a semaphore operatively connected with said piston and adapted to be horizontally extended to a signalling position when said piston is moved in a given direction, and vacuum operated means engageable with portions of said semaphore at a given point in its outward movement and operative for tilting said semaphore upwardly or downwardly under the control of said valve to additional signalling positions, said valve being operable reversely for extending and retracting said semaphore.

7. A direction signal for vehicles comprising a cylinder, a vacuum operated piston therein, a semaphore operatively connected therewith for extension in a horizontal movement to a given signalling position and thereafter adapted to be tilted in reverse directions to other signalling positions, vacuum operated means for regulating the tilting of said semaphore, and a control valve connected with a source of vacuum and with said cylinder and with said tilting means, for selectively extending said semaphore to and retracting the same from different signalling positions.

8. A direction signal for vehicles comprising a cylinder, a vacuum operated piston therein, a semaphore operatively connected therewith, vacuum operated devices adapted to simultaneously engage and hold said semaphore in a horizontally extended position and selectively engageable therewith for tilting the semaphore reversely, for affording different direction signals, and a control valve connected with a source of vacuum and with said cylinder and with said devices, for regulating and effecting the operation of said signals.

9. A direction signal for vehicles comprising a cylinder, a vacuum operated piston therein, guides longitudinally extended from said cylinder, a semaphore slidably and tiltably mounted on said guides and operatively connected with said piston, a control valve connected with a source of vacuum, connections between said valve and said cylinder for applying vacuum to opposite sides of said piston, for extending and retracting said semaphore, and cooperating means on said guides and on said semaphore for tilting said semaphore selectively upwardly and downwardly from a horizontal position, for affording different signals in the operation of a vehicle.

10. A direction signal for vehicles comprising a cylinder, a vacuum operated piston therein, stationary guides longitudinally extended from said cylinder, a semaphore slidably mounted on said guides and operatively connected with said piston, and a control valve connected with a source of vacuum and with opposite portions of said cylinder and operable for applying vacuum to opposite sides of said piston for extending and retracting said semaphore.

11. A direction signal for vehicles comprising a cylinder, a vacuum operated piston therein, stationary guides longitudinally extended from said cylinder, a semaphore slidably and tiltably mounted on said guides, means normally holding said semaphore against tilting and selectively operable for tilting the same in opposite directions when the semaphore is extended to a predetermined extent, and a control valve connected with a source of vacuum and with said cylinder and operable for extending and retracting said semaphore.

12. A direction signal for vehicles comprising a cylinder, a vacuum operated piston therein, guides longitudinally extended from said cylinder, a semaphore slidably and tiltably mounted on said guides, vacuum operated means for selectively tilting said semaphore from a horizontal position when the semaphore has reached a predetermined point during its extension to signalling position, a control valve connected with a source of vacuum, and connections between said control valve and said cylinder and between said valve and said tilting means whereby said semaphore may be selectively positioned upon the operation of said valve for displaying different signals.

13. A direction signal for vehicles comprising a cylinder, a vacuum operated piston therein, a semaphore slidably and tiltably connected with said piston, vacuum operated means for regulating the tilting of said semaphore from a normally horizontal signalling position, a control valve embodying a casing connected at different points with said cylinder and with said vacuum operated tilting means, and a valve connected with a source of vacuum and movable in said casing for selectively establishing communication between opposite portions of said cylinder and said casing and between said casing and said vacuum operated tilting means, for selectively displaying different signals.

CHARLES O. HILL.